United States Patent
Althöfer et al.

(10) Patent No.: US 8,722,566 B2
(45) Date of Patent: *May 13, 2014

(54) HONEYCOMB BODY HAVING A METALLIC FOIL WITH AN OXIDE COAT, FOIL HAVING AN OXIDE COAT AND METHOD FOR PRODUCING AN OXIDE COAT ON A METALLIC FOIL

(75) Inventors: Kait Althöfer, Wiehl (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.
This patent is subject to a terminal disclaimer.

(21) Appl. No.: 12/719,089

(22) Filed: Mar. 8, 2010

(65) Prior Publication Data
US 2010/0184590 A1 Jul. 22, 2010

Related U.S. Application Data

(63) Continuation of application No. PCT/EP2008/059964, filed on Jul. 30, 2008.

(30) Foreign Application Priority Data

Sep. 7, 2007 (DE) .......................... 10 2007 042 618

(51) Int. Cl.
| | | |
|---|---|---|
| *B01J 23/745* | (2006.01) | |
| *B01J 32/00* | (2006.01) | |
| *B01J 21/18* | (2006.01) | |
| *F01N 3/28* | (2006.01) | |
| *B23K 1/00* | (2006.01) | |
| *B23K 1/008* | (2006.01) | |
| *C23C 8/14* | (2006.01) | |

(52) U.S. Cl.
CPC .............. *F01N 3/281* (2013.01); *B23K 1/0014* (2013.01); *B23K 1/008* (2013.01); *C23C 8/14* (2013.01); *F01N 2330/04* (2013.01); *Y10S 977/773* (2013.01)
USPC .......................... 502/185; 502/439; 977/773

(58) Field of Classification Search
CPC ....... C23C 8/14; F01N 3/281; F01N 2330/04; B23K 1/008; B23K 1/0014
USPC .................................... 502/185, 439
See application file for complete search history.

(56) References Cited

U.S. PATENT DOCUMENTS 3,084,770 A * 4/1963 Wirsing, Jr. ................... 428/593
4,686,155 A  8/1987 Kilbane et al.
(Continued)

FOREIGN PATENT DOCUMENTS

DE  19951941 C1  7/2001
DE  10239205 A1  3/2004
(Continued)

OTHER PUBLICATIONS

English translation of Nakayama (JP02-057670).*
(Continued)

*Primary Examiner* — Jun Li
(74) *Attorney, Agent, or Firm* — Laurence A. Greenberg; Werner H. Stemer; Ralph E. Locher

(57) ABSTRACT

A honeycomb body, in particular a catalyst carrier body, includes metallic foil of high-temperature corrosion-resistant steel with connecting points and an oxide layer with a thickness of 60 to 80 or 70 to 75 nm on each surface. The foil is composed of steel with chromium and aluminum components, particularly 1 to 5% aluminum. The oxide layer is substantially aluminum oxide or γ-aluminum oxide with a uniform thickness having a tolerance of less than 10% or less than 5% on all surfaces. The oxide layer may be on a rolled foil having a mean surface roughness of greater than 0.3 or 0.5 μm or approximately 0.6 μm in rolling direction and/or transversely thereto. The honeycomb body is durable under high loads and has defined connecting points. A foil having an oxide coat and a method for producing an oxide coat on a metallic foil are also provided.

25 Claims, 2 Drawing Sheets

(56) References Cited

U.S. PATENT DOCUMENTS

| | | | |
|---|---|---|---|
| 4,797,329 | A | 1/1989 | Kilbane et al. |
| 4,829,655 | A | 5/1989 | Cornelison et al. |
| 5,316,997 | A | 5/1994 | Toyoda et al. |
| 5,405,422 | A | 4/1995 | Ueda et al. |
| 5,529,759 | A | 6/1996 | Sanada et al. |
| 5,874,153 | A * | 2/1999 | Bode et al. ............ 428/116 |
| 5,981,026 | A | 11/1999 | Bode et al. |
| 6,589,670 | B2 | 7/2003 | Bergmann |
| 6,689,328 | B1 * | 2/2004 | Otani et al. ............ 422/180 |
| 7,318,276 | B2 | 1/2008 | Brueck et al. |
| 2002/0146360 | A1 | 10/2002 | Bruck |
| 2007/0104623 | A1 * | 5/2007 | Dettling et al. ............ 422/177 |

FOREIGN PATENT DOCUMENTS

| | | | |
|---|---|---|---|
| EP | 0204423 A2 | 12/1986 | |
| EP | 0283910 A2 | 9/1988 | |
| EP | 0437626 A1 | 7/1991 | |
| EP | 0559907 A1 | 9/1993 | |
| JP | 61281861 A | 12/1986 | |
| JP | 02057670 A * | 2/1990 | ............ C23C 2/02 |
| JP | 2003525749 A | 9/2003 | |
| WO | 9521022 A1 | 8/1995 | |
| WO | 0166300 A1 | 9/2001 | |

OTHER PUBLICATIONS

International Search Report dated Dec. 18, 2008.

* cited by examiner

US 8,722,566 B2

HONEYCOMB BODY HAVING A METALLIC FOIL WITH AN OXIDE COAT, FOIL HAVING AN OXIDE COAT AND METHOD FOR PRODUCING AN OXIDE COAT ON A METALLIC FOIL

CROSS-REFERENCE TO RELATED APPLICATION

This is a continuation, under 35 U.S.C. §120, of copending International Application No. PCT/EP2008/059964, filed Jul. 30, 2008, which designated the United States; this application also claims the priority, under 35 U.S.C. §119, of German Patent Application 10 2007 042 618.8, filed Sep. 7, 2007, the prior applications are herewith incorporated by reference in their entirety.

BACKGROUND OF THE INVENTION

Field of the Invention

The present invention relates to a honeycomb body having a metallic foil with an oxide coat, a foil having an oxide coat and a method for producing an oxide coat on a metallic foil, in which the metallic foil is composed of a high-temperature corrosion resistant steel and is provided, on its surfaces, with the oxide coat.

It has long been known to use metallic foils in the production of honeycomb bodies, in particular for exhaust-gas systems of internal combustion engines. Due to the high temperatures in such applications, use is usually made of chromium-containing and aluminum-containing steels. Typical foils have a thickness of 20 to 180 μm (micrometers), in particular in a range of from 30 to 120 μm, and are produced by rolling. In particular, when such foils are used for metallic honeycomb bodies and other exhaust-gas purification components, particular demands must also be made on the surface. The property of high-temperature corrosion resistance arises specifically from the fact that a protective oxide coat is formed on the surface of such foils, which oxide coat is composed primarily of aluminum oxide, in particular γ-aluminum oxide, in the case of aluminum-containing steels.

In general, honeycomb bodies produced from metallic foils in exhaust-gas systems are coated with a catalytically active material which is applied in the form of a so-called washcoat. In that case, the protective oxide coat on the foil must additionally permit good adhesion of the additional coating. Finally, a further problem must be taken into consideration, specifically that the connecting technique used in the production of honeycomb bodies from metallic foils is responsible for the stability of the honeycomb body. Years of experience have shown that, in a honeycomb body which is produced from differently-structured foils, not all of the connecting points between the foils should be connected to one another, rather it is expedient to provide connections only in selected regions, since only in that way is it possible to ensure simultaneously high stability and elasticity under fluctuating thermal loading. As a connecting technique, consideration is given in particular to brazing or hard soldering, preferably high-temperature vacuum brazing. At high temperatures, however, metallic foils also become connected to one another at their contact points by diffusion connections as a function of various parameters. That may be utilized in a targeted fashion to produce connections, but may also be considerably disruptive if certain contact regions are specifically not to be connected to one another. For those processes, too, the oxide coat on the foils plays an important role since, in the case of very thick oxide coats, it is not possible to obtain good brazed connections or good diffusion connections, whereas in the case of very thin oxide coats, not only is it possible to obtain good brazed connections, but diffusion connections can also form at all of the contact points.

SUMMARY OF THE INVENTION

It is accordingly an object of the invention to provide a honeycomb body having a metallic foil with an oxide coat, a foil having an oxide coat and a method for producing an oxide coat on a metallic foil, which overcome the hereinafore-mentioned disadvantages of the heretofore-known bodies, foils and methods of this general type, which at least partially improve known techniques and which provide a metallic foil with an oxide coat which has good properties for the production of a honeycomb body, in particular for the described applications.

With the foregoing and other objects in view there is provided, in accordance with the invention, a honeycomb body, comprising at least one metallic foil formed of a high-temperature corrosion resistant steel, the at least one metallic foil having opposite surfaces, the at least one metallic foil having connecting points at least in some regions, and an oxide coat on each of the surfaces, the oxide coat having a thickness of from 60 to 80 nm (nanometers).

That thickness range has proven to be particularly expedient for the production of honeycomb bodies with the desired properties, in particular for use in exhaust-gas systems of motor vehicles. In honeycomb bodies of this type, differently structured foils are typically layered and/or wound one on top of the other, wherein the oxide coat should as far as possible have no adverse effect on mechanical production steps. In the layered or wound honeycomb body, there are contact points between the layered or wound foils and/or between foils and other components, for example a casing tube or a metallically encased sensor. Through the use of various known methods, it is possible in some regions for the contact points to be made into fixed connecting points, for example by applying brazing material (in solid or liquid form) and subsequently heating. The brazed connections which are formed are not significantly degraded by an oxide coat with the thickness according to the invention. Secondly, the oxide coat prevents undesired diffusion connections from forming at contact points which are not to be connected during the heating of the honeycomb body. For this purpose, the oxide coat is thick enough for the desired selective production of connecting points to be aided considerably through the use of the oxide coat. For this purpose, the two planar surfaces of the foil (or if appropriate only one planar surface) can be at least partially—but preferably completely—provided with the oxide coat proposed herein, but at any rate in particular at the contact points of the adjacent foils during the production of the honeycomb body.

In accordance with another feature of the invention, it is preferable for the metallic foil to be composed of a steel with chromium and aluminum constituents, in particular steels with aluminum contents of 1 to 5% [percent by weight]. An aluminum content of up to 5% is particularly expedient for high-temperature corrosion resistance, without having significant disadvantages for the other properties of a foil.

In accordance with a further feature of the invention, the oxide coat is composed substantially of aluminum oxide, in particular γ-aluminum oxide.

In accordance with an added feature of the invention, it is particularly advantageous for the oxide coat to have a uniform thickness, with a tolerance of less than 10%, preferably less than 5%, on all surfaces of the honeycomb body. In the targeted selective production of connecting points and the targeted prevention of connections in other regions, it may be necessary for similar conditions to prevail at all of the connecting points, for which reason a low tolerance of the oxide coat is advantageous.

In accordance with an additional feature of the invention, for the production of brazed connections, it is important for brazing material, which is applied for example in powder form in certain regions, to be able to be distributed over a small surrounding region by flowing when the melting temperature is reached. The flowing and wetting properties of a brazing material on a surface are dependent not only on the oxide coat but rather also on the surface roughness of the material which is used. The surface roughness also influences the probability of the formation of diffusion connections. A relatively rough surface with a mean surface roughness of greater than 0.3 µm (micrometers) has proven to be advantageous. The specified roughness values are arithmetic mean values of the roughness, usually abbreviated as $R_a$, measured by using the stylus method. That method is described, for example, in the article "Rauheitsmessung an gewalzten Feinblechen" ["Roughness Measurement of Rolled Fine Metal Sheets"] in the periodical "Stahl and Eisen 109" ["Steel and iron 109"] (Year 1989, No. 12, pages 589 and 590).

In accordance with yet another feature of the invention, which is particularly suitable, rolled foils are used having a surface roughness in the rolling direction and/or in the transverse direction with respect thereto with a mean surface roughness of greater than 0.3 µm, preferably greater than 0.5 µm, particularly preferably greater than 0.6 µm. Those roughnesses in conjunction with the oxide coat according to the invention yield particularly expedient properties for processing, for brazing, for preventing diffusion connections and for high-temperature corrosion resistance.

In accordance with yet a further feature of the invention, the described properties yield their particular advantages especially if the connecting points are produced in a honeycomb body according to the invention through the use of brazing, in particular high-temperature vacuum brazing. Despite the high temperature in that brazing process, only few or weak diffusion connections are produced in the non-brazed regions.

In accordance with yet an added feature of the invention, the property of the steel foils under consideration of forming diffusion connections at contact points at high temperatures, and the property of the oxide coat according to the invention of preventing such connections, may also expediently be utilized in the production of a honeycomb body by virtue of the oxide coat being removed in certain regions in which connections are desired. If the oxide coat is removed, for example in strips, durable diffusion connections are produced in a subsequent honeycomb body in precisely those locations where the oxide coat has been removed, while no connections or only weak connections are formed at other connecting points as a result of the protection by the oxide coat. A honeycomb body having the desired properties can be produced in this way.

In accordance with yet an additional feature of the invention, honeycomb bodies according to the invention may, after their production, be provided with an additional coating on the oxide coats, in particular with a so-called washcoat and/or catalytically active materials. For applications relating to the exhaust-gas purification of internal combustion engines, high-grade metals such as platinum or rhodium are typically contained in an additional coating of that type.

With the objects of the invention in view, there is also provided a foil for producing a metallic honeycomb body or a catalyst carrier body. The foil comprises two opposite foil surfaces, and an oxide coat on the two surfaces. The oxide coat has a thickness of between 60 and 80 nm (nanometers), preferably between 70 and 75 nm. A foil of this type can preferably have the above-described roughnesses.

With the objects of the invention in view, there is furthermore provided a method for producing an oxide coat. The method comprises providing an aluminum-containing, high-temperature corrosion resistant steel foil, and maintaining the foil at temperatures of between 750° C. and 800° C. for between 4 and 8 seconds, preferably approximately 6 seconds, in air as an ambient atmosphere, for producing the oxide coat with a thickness of 60 to 80 nm (nanometers) on the foil. This may take place, for example, while the foil passes through an annealing section, or in similar processes. The described foils are suitable for the production of honeycomb bodies of practically all known shapes and production methods in which steel foils have also previously been used.

With the objects of the invention in view, there is concomitantly provided a method for producing an oxide coat, preferably with a thickness of 60 to 80 nm (nanometers). The method comprises providing an aluminum-containing, high-temperature corrosion resistant steel foil, and coating the foil with nanoparticles, preferably formed of aluminum oxide, to produce the oxide coat. This alternative production method may also be used for other coat thicknesses if required. Such a method may be energetically more expedient than heating the foil in air, and may yield qualitative improvements in the oxide coat. Such a coating may also take place selectively in certain regions.

Other features which are considered as characteristic for the invention are set forth in the appended claims.

Although the invention is illustrated and described herein as embodied in a honeycomb body having a metallic foil with an oxide coat, a foil having an oxide coat and a method for producing an oxide coat on a metallic foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
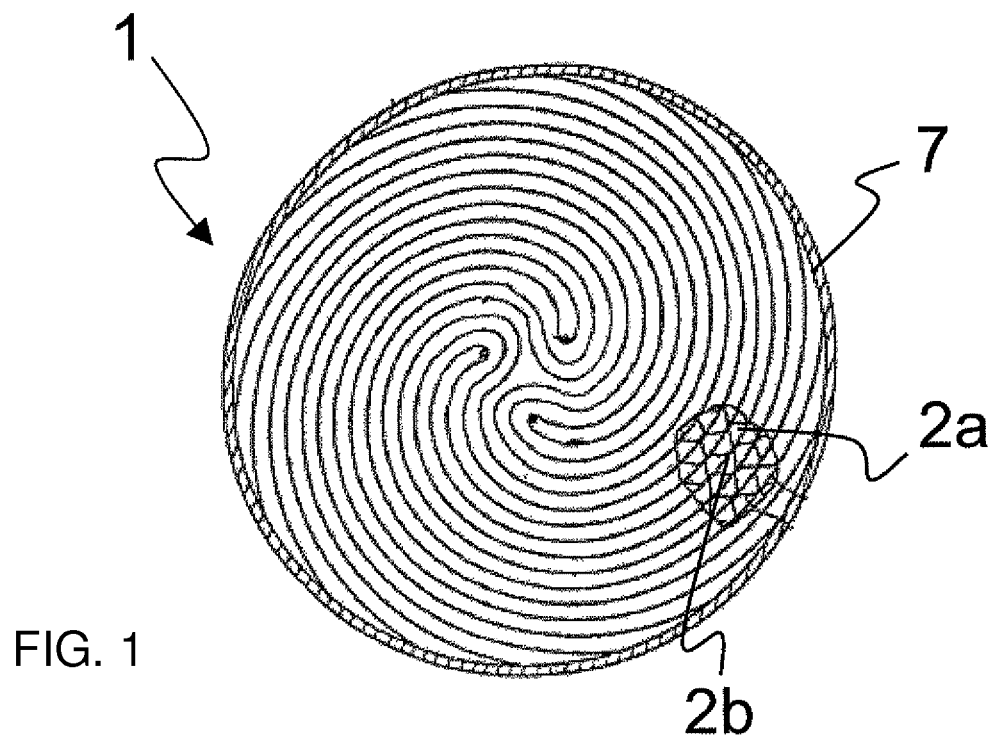
FIG. 1 is a diagrammatic, cross-sectional view of a honeycomb body.

Referring now to the figures of the drawings in detail and first, particularly, to FIG. 1 thereof, there is seen a diagrammatic, end-elevational view of an example of a honeycomb body 1, which is constructed from smooth metallic foils 2a and corrugated metallic foils 2b that are disposed in a casing tube 7 shown in cross section, although the invention is not restricted to the examples shown in the drawings. The precise shape of the foil layers is not of importance in the present case and the invention may be applied to practically all known shapes of metallic honeycomb bodies.

Figure 2:
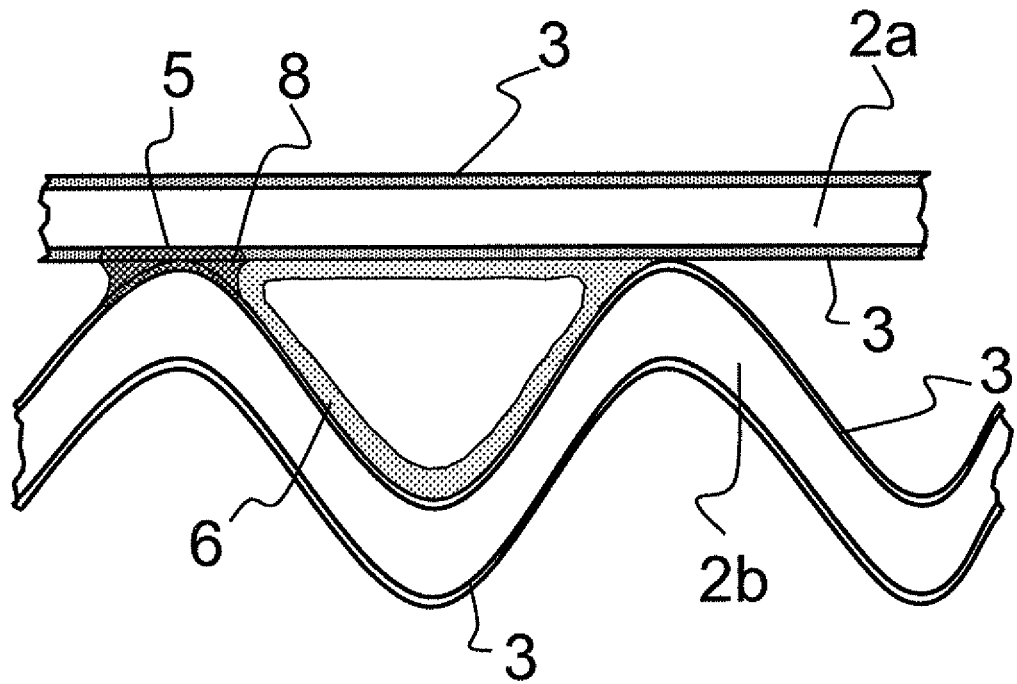
FIG. 2 is a fragmentary, enlarged, cross-sectional view of a region of a connecting point between two foils in a honeycomb body according to a first variant of the invention.

FIG. 2 shows a diagrammatic, sectional view of a smooth foil layer 2a and a corrugated foil layer 2b abutting against one another. A connecting point 5 is formed by brazing material 8 at a contact point of the foil layers 2a, 2b. Even though the foil layers 2a, 2b are provided according to the invention with oxide coats 3, fixed connecting points 5 can be generated by brazing. However, no connections are formed at contact points without brazing material, as is illustrated at an adjacent connecting point for comparison. The situation in a finished honeycomb body is indicated diagrammatically by an additional coating 6, which is typically applied after a honeycomb body is finished.

Figure 3:
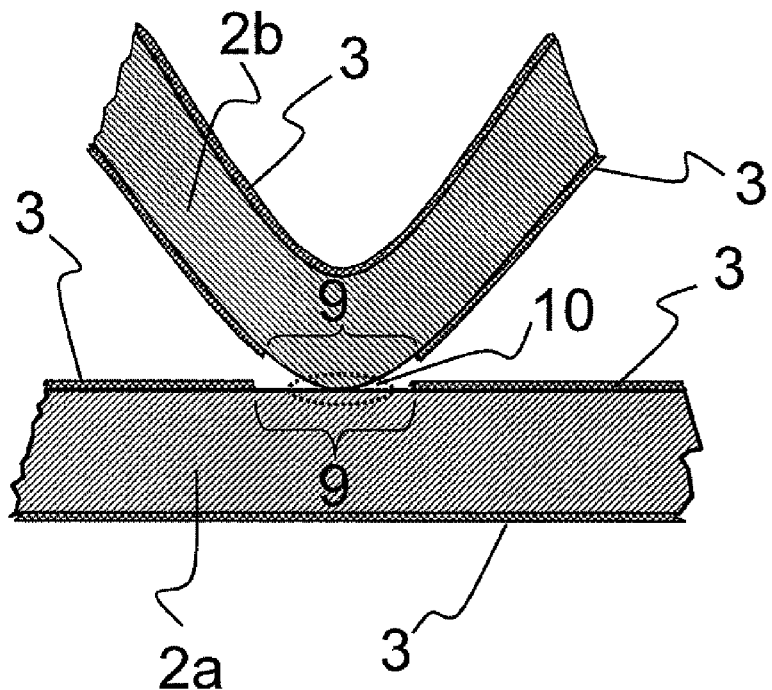
FIG. 3 is a view similar to FIG. 2 of another example of a connecting point in a honeycomb body.

FIG. 3 shows the situation at a contact point between a smooth foil layer 2a and a corrugated foil layer 2b if the oxide coat 3 is removed from the foil layers 2a, 2b in partial regions 9. In this case, a diffusion connection 10 is formed at the connecting point when the honeycomb body is heated.

Figure 4:
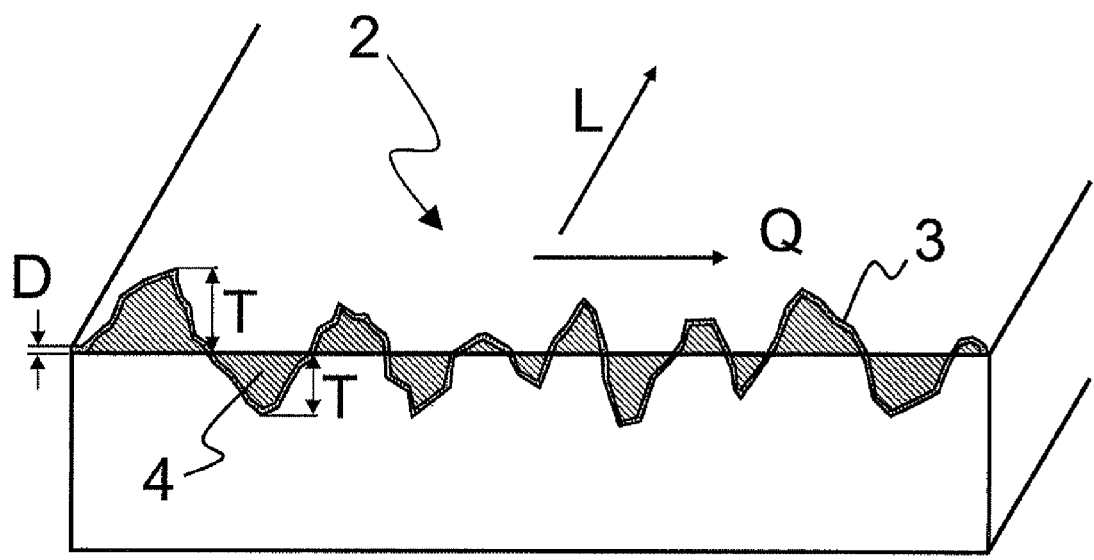
FIG. 4 is a further enlarged, fragmentary, partly-sectional perspective view of a foil according to the invention.

FIG. 4 diagrammatically shows, in a partially sectional perspective view, which is exaggerated in terms of scale, the situation with regard to the coating and roughness on the surface of a foil 2 according to the invention. Foils of this type are typically produced in long strips by rolling, with the longitudinal direction being indicated in FIG. 4 by an arrow L, which corresponds to the rolling direction. A transverse direction, which is perpendicular to the longitudinal direction L and in which the roughness is diagrammatically illustrated, is indicated by an arrow Q. It can be seen that the oxide coat 3 has a thickness D and a small dimension in relation to the roughness of the surface, that is to say it substantially follows the profile of the surface contour and does not, for example, even out the surface contour. The mean surface roughness is indicated diagrammatically by hatched areas. Peaks and depressions 4 of different depth T or height are formed on a surface of the foil, with the surface roughness specifying an average value of a deviation of the peaks and troughs from a mean level. The surface roughness is generally denoted as $R_a$. There are different options for influencing the roughness of a foil surface. For example, the roughness may be reduced by polishing and increased by brushing or blasting using suitable tools. The roughness range, which is particularly suitable for the invention, is greater than conventional values in the production of steel foils by rolling.

The present invention is particularly suitable for the production of durable, high-temperature resistant honeycomb bodies for use in exhaust-gas systems of internal combustion engines, in particular in motor vehicles.

The invention claimed is:

1. A honeycomb body, comprising:
    at least one metallic foil formed of a high-temperature corrosion resistant steel;
    said at least one metallic foil having opposite planar surfaces;
    said at least one metallic foil having connecting points at least in some regions; and
    an oxide coat completely covering at least one of said opposite planar surfaces, said oxide coat formed substantially of aluminum oxide and having a thickness of from 60 to 80 nm (nanometers) and said oxide coat being present within said connecting points.

2. The honeycomb body according to claim 1, wherein the honeycomb body is a catalyst carrier body.

3. The honeycomb body according to claim 1, wherein said thickness of said oxide coat is from 70 to 75 nm (nanometers).

4. The honeycomb body according to claim 1, wherein said steel of said at least one metallic foil has chromium and aluminum components.

5. The honeycomb body according to claim 4, wherein said steel contains 1 to 5% aluminum.

6. The honeycomb body according to claim 1, wherein said aluminum oxide is γ-aluminum oxide.

7. The honeycomb body according to claim 1, which further comprises other surfaces, said oxide coat having a uniform thickness with a tolerance of less than 10% on all of said surfaces.

8. The honeycomb body according to claim 7, wherein said tolerance is less than 5%.

9. The honeycomb body according to claim 1, wherein said foil has a mean surface roughness of greater than 0.3 μm (micrometers) in at least one measurement direction.

10. The honeycomb body according to claim 1, wherein said foil is a rolled foil having a rolling direction and a mean surface roughness of greater than 0.3 μm (micrometers), at least in said rolling direction.

11. The honeycomb body according to claim 10, wherein said mean surface roughness is also greater than 0.3 μm (micrometers) in a transverse direction perpendicular to said rolling direction.

12. The honeycomb body according to claim 10, wherein said mean surface roughness is greater than 0.5 μm (micrometers).

13. The honeycomb body according to claim 10, wherein said mean surface roughness is approximately 0.6 μm (micrometers).

14. The honeycomb body according to claim 1, wherein said oxide coat is formed of nanoparticles applied to said surfaces of said at least one metallic foil.

15. The honeycomb body according to claim 1, wherein said connecting points are brazed or high-temperature vacuum brazed connecting points.

16. The honeycomb body according to claim 15, which further comprises non-brazed regions outside said connecting points not being connected to one another.

17. The honeycomb body according to claim 15, which further comprises non-brazed regions outside said connecting points being weakly connected to one another by diffusion connections.

18. The honeycomb body according to claim 1, which further comprises partial regions around said connecting points, and diffusion connections in said partial regions, said oxide coat being completely or partially removed or not applied in said partial regions.

19. The honeycomb body according to claim 1, which further comprises an additional coating on said oxide coat.

20. The honeycomb body according to claim 19, wherein said additional coating includes at least one of a washcoat or catalytically active materials.

21. The honeycomb body according to claim 1, wherein said oxide coat completely covers both of said opposite planar surfaces.

22. A method for producing a metallic honeycomb body having an oxide coat, the method comprising the following steps:
    providing at least one aluminum-containing, high-temperature corrosion resistant steel foil with two opposite planar foil surfaces;
    producing connecting points at least in some regions of the at least one foil; and
    maintaining the at least one foil at temperatures of between 750° C. and 800° C. for between 4 and 8 seconds in air as an ambient atmosphere, for producing the oxide coat with a thickness of 60 to 80 nm (nanometers) completely covering at least one of the two opposite planar surfaces on the at least one aluminum-containing, high-temperature corrosion resistant steel foil and with the oxide coat formed substantially of aluminum oxide remaining within the connecting points of the at least one foil in the metallic honeycomb body produced from the at least one foil.

23. The method according to claim 22, which further comprises maintaining the foil at the temperatures of between 750° C. and 800° C. for approximately 6 seconds.

24. A method for producing a metallic honeycomb body having an oxide coat, the method comprising the following steps:
  providing at least one aluminum-containing, high-temperature corrosion resistant steel foil with two opposite planar foil surfaces;
  producing connecting points at least in some regions of the at least one foil; and
  coating the at least one foil with nanoparticles to produce the oxide coat formed substantially of aluminum oxide completely covering at least one of the two opposite planar surfaces and having a thickness of 60 to 80 nm (nanometers) and with the oxide coat remaining within the connecting points of the at least one foil in a the metallic honeycomb body produced from the at least one foil.

25. The method according to claim 24, wherein the nanoparticles are formed of aluminum oxide.

\* \* \* \* \*